(12) United States Patent
Wu (10) Patent No.: US 9,389,853 B2
(45) Date of Patent: Jul. 12, 2016

(54) ADAPTIVE CONTROL OF PROCESSOR PERFORMANCE

(71) Applicant: Advanced Micro Devices, Inc., Sunnyvale, CA (US)

(72) Inventor: Bin Wu, Santa Clara, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 584 days.

(21) Appl. No.: 13/645,633

(22) Filed: Oct. 5, 2012

(65) Prior Publication Data
US 2014/0101420 A1    Apr. 10, 2014

(51) Int. Cl.
*G06F 1/32* (2006.01)
*G06F 9/00* (2006.01)

(52) U.S. Cl.
CPC .. *G06F 9/00* (2013.01); *G06F 1/32* (2013.01); *G06F 1/324* (2013.01); *G06F 1/3206* (2013.01); *G06F 1/329* (2013.01); *G06F 1/3296* (2013.01); *Y02B 60/1217* (2013.01); *Y02B 60/1285* (2013.01); *Y02B 60/144* (2013.01)

(58) Field of Classification Search
CPC ............... G06F 1/32; G06F 1/28; G06F 1/26
USPC .................................. 713/300–340
See application file for complete search history.

(56) References Cited

U.S. PATENT DOCUMENTS

| 4,197,576 | A  | * | 4/1980  | Martin Sanchez ............. 700/31 |
| 4,755,795 | A  | * | 7/1988  | Page ............................... 341/51 |
| 5,977,957 | A  | * | 11/1999 | Miller et al. ................... 345/174 |
| 6,067,412 | A  | * | 5/2000  | Blake .................. G06F 11/3409 714/E11.192 |
| 7,103,101 | B1 | * | 9/2006  | Davila ...................... 375/240.18 |
| 7,739,537 | B2 | * | 6/2010  | Albonesi et al. .............. 713/501 |
| 8,051,310 | B2 | * | 11/2011 | He et al. ........................ 713/320 |
| 8,650,423 | B2 | * | 2/2014  | Li et al. ......................... 713/322 |
| 2008/0201591 | A1 | * | 8/2008  | Hu et al. ....................... 713/323 |
| 2009/0210740 | A1 | * | 8/2009  | Huang .................. G06F 1/3203 713/502 |
| 2009/0248216 | A1 | * | 10/2009 | McKim et al. ................ 700/293 |
| 2012/0068737 | A1 | * | 3/2012  | Tuten ................... H02M 3/157 327/50 |
| 2013/0232346 | A1 | * | 9/2013  | Wu ............................... 713/300 |
| 2013/0311792 | A1 | * | 11/2013 | Ponnathota et al. .......... 713/300 |

OTHER PUBLICATIONS

Sung-Yong Bang, Kwanhu Bang, Sungroh Yoon, "Run-Time Adaptive Workload Estimation for Dynamic Voltage Scaling", IEEE Transactions on Computer-Aided Design of Integrated Circuits and Systems, vol. 28, No. 9 Sep. 2009.*

(Continued)

*Primary Examiner* — Jaweed A Abbaszadeh
*Assistant Examiner* — Keshab Pandey
(74) *Attorney, Agent, or Firm* — Volpe and Koenig, P.C.

(57) ABSTRACT

Embodiments include a method, system and an article of manufacture for configuring at least one processor. These include changing a sampling frequency of at least a portion of a control loop coupled to the processor in response to a change in a current input workload, determining a current error of the processor after the changing, and adjusting one or more of a clock rate and a voltage of the processor to reduce a difference between the current error and a desired error.

21 Claims, 7 Drawing Sheets

(56) References Cited

OTHER PUBLICATIONS

Raid Ayoub, et al.; "OS-level Power Minimization Under Tight Performance Constraints in General Purpose Systems"; Department of Computer Science and Engineering, University of California at San Diego, La Jolla, CA 92093-0404; ISLPED '11 Proceedings of the 17th IEEE/ACM international symposium on Low-power electronics and design; pp. 321-326; IEEE Press Piscataway, NJ, USA © 2011; ISBN: 978-1-61284-660-6.

* cited by examiner

ADAPTIVE CONTROL OF PROCESSOR PERFORMANCE

BACKGROUND

1. Field of the Invention

The present invention is generally directed to improving the performance and energy consumption of processors.

2. Background Art

The evolution of modern processor architectures, in conjunction with technology scaling, has produced processors with high performance to meet increasing computational demands, and has also made power efficiency a paramount design objective for a wide array of enterprise-class and embedded processors. In addition to saving energy, reduction of power consumption can lead to dramatic benefits in reducing thermal hot spots and the cost of cooling for processors. To this end, dynamic voltage and frequency scaling (DVFS) has become a key avenue for achieving power efficiency via adjustment of the operating voltage and frequency of processors at runtime. DVFS schemes dynamically change a voltage and/or a frequency of a processor in response to one or more factors affecting a processor.

A central challenge in developing DVFS schemes is to balance two competing objectives: maximizing of power saving and ensuring tight fine-grain performance. The latter is particularly critical for latency-sensitive applications that require a high-degree of Quality of Service (QoS) or high levels of real-time responsiveness.

Conventional DVFS controllers are designed for specific application/workload. However, in many environments, general processor systems are required to switch between multiple applications/workloads with different characteristics. When a processor is subjected to multiple applications/workloads with different characteristics that go beyond the workloads originally envisioned, conventional DVFS systems may not yield adequate QoS or real-time responsiveness.

SUMMARY OF EMBODIMENTS

Embodiments of this invention adaptively adjust a sampling frequency and gain of a DVFS control loop to ensure control precision even when input workload characteristics substantially changes. Embodiments yield desired power efficiency, QoS, and real-time responsiveness even when the input workloads change beyond the range of inputs for which the control loop was initially designed.

Embodiments include a method, system and an article of manufacture for configuring a processor. Aspects may include changing a sampling frequency of at least a portion of a control loop coupled to the processor in response to a change in a current input workload, determining a current error of the processor after the changing, and adjusting one or more of a clock rate and a voltage of the processor to reduce a difference between the current error and a desired error.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the pertinent art to make and use the invention. Various embodiments of the present invention are described below with reference to the drawings, wherein like reference numerals are used to refer to like elements throughout.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF EMBODIMENTS OF THE INVENTION

In the detailed description that follows, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The term "embodiments of the invention" does not require that all embodiments of the invention include the discussed feature, advantage or mode of operation. Alternate embodiments may be devised without departing from the scope of the invention, and well-known elements of the invention may not be described in detail or may be omitted so as not to obscure the relevant details of the invention. In addition, the terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

DVFS is applied in various processors and systems to adjust the processor performance according to actual workload requirements for the purpose of power saving. A DVFS controller is used to match the performance of processor with the workload. Conventional DVFS controllers are designed for a specific workload or a specific family of workloads. However, many processors and systems including processors execute multiple tasks that have different characteristics. For example, a tablet computer may be required to run video, audio, gaming, and web surfing application. Each of these applications may represent workloads that are substantially different from each other. When input workloads are different and are not within the envisioned design targets of the corresponding controllers, conventional DVFS systems may not perform adequately.

Embodiments of the present invention provide for the use of a controller, and adaptively adjust the sample frequency of the DVFS control loop and a gain to achieve a performance-workload match even when workload characteristics change substantially. Embodiments disclosed herein deliver the desired control precision even under substantial change of the workload characteristics. For slowly changing workloads, embodiments can reduce the control loop frequency automatically to reduce the overhead associated with changing power states of the processor.

Embodiments disclosed herein improve, in certain conditions, power saving and also improve, in certain conditions, tight fine-grain performance of a processor or one or more cores of a processor (i.e., a logic block employing DVFS). A DVFS controller provides a speed-setting command to a DVFS module (referred to herein as DVFS hardware/software module or DVFS HW/SW module) which accordingly adjusts the clock rate and/or supply voltage of the processor. The speed-setting command is generated based upon the current input workload of the processor and an error, referred to herein as the workload-performance error, of the processor. In order to ensure finegrained performance of the processor, e.g. a consistently low workload-performance error from the processor, the DVFS controller adaptively changes the sampling frequency and the gain in accordance with the current input workload. Thus, unlike conventional DVFS techniques, embodiments disclosed herein are not limited to workloads with particular characteristics and provide power savings and good processor performance for any input workload. In this disclosure, the terms "processor" and "processor core" may be used interchangeably.

Figure 1:
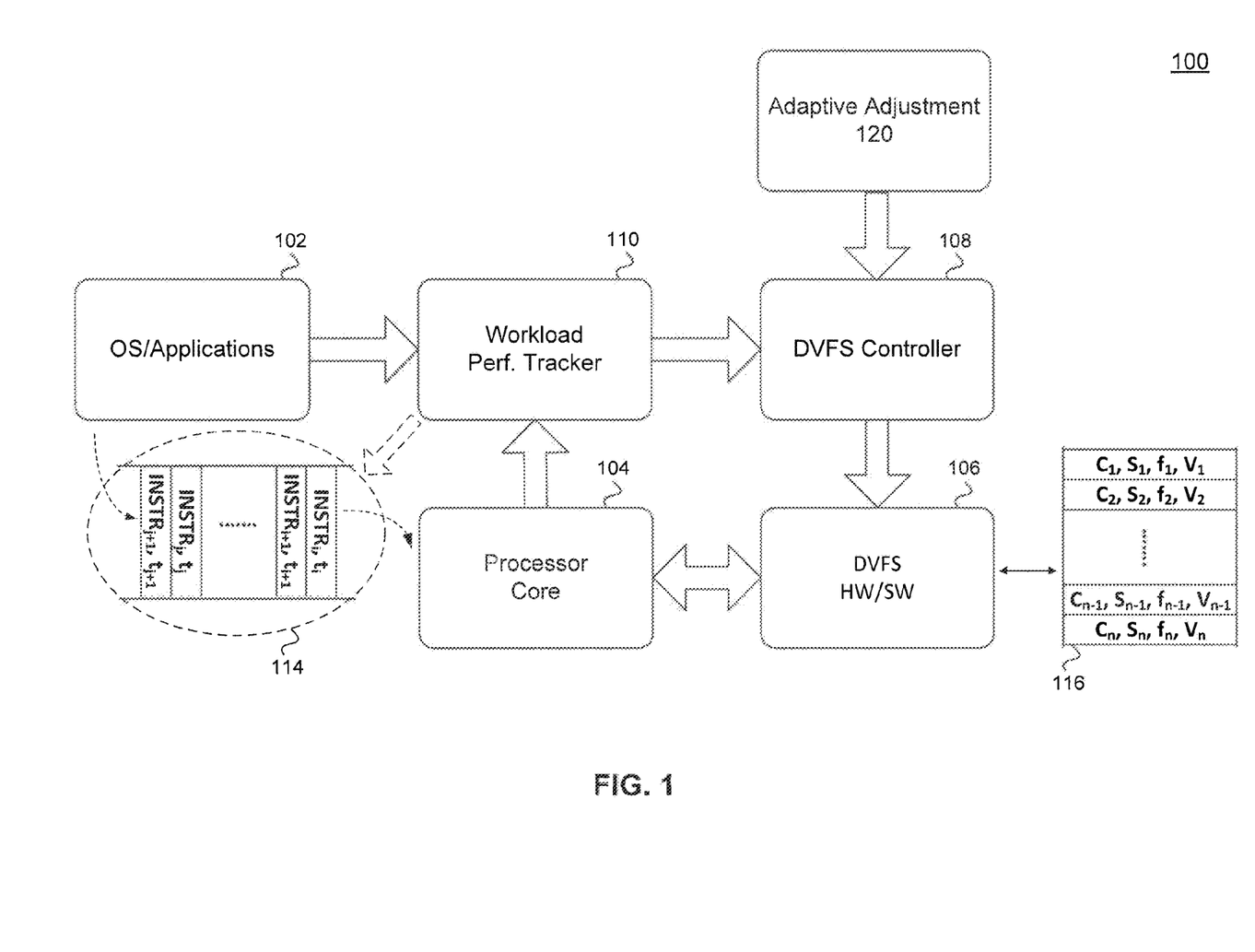
FIG. 1 is an illustrative block diagram of a processing system, in accordance with an embodiment of the present invention.

FIG. 1 is an illustrative block diagram of a portion of a DVFS system 100, in accordance with an embodiment of the present invention. An application software or operating system (OS) 102 schedules and feeds a stream of instructions to DVFS system 100. Each instruction or instruction segment in the stream is time-stamped with its execution deadline. The execution deadlines are determined by either real-time requirements or QoS requirements of the applications. The execution deadline of an instruction is the latest time by which the instruction must be executed. An instruction that is not executed by the processor by its execution deadline may be considered expired. The instruction stream is stored and managed in a first-in-first-out (FIFO) queue 114 (which can be implemented as a list, linked list, ring or other data structure that can implement a queue) by the DVFS workload-performance tracker module (Tracker module) 110. In some embodiments, data structures other than queues or FIFO queues may be used to maintain the instruction stream by tracker module 110. Tracker module 110 obtains scheduled instructions from applications or OS 102, and pushes them into the tail of the queue 114. Tracker module 110 may monitor an instruction pointer register and other status registers (not shown) of processor 104 to determine the retired instructions and remove them from the head of 114.

The number of instructions in queue 114 with their deadlines marked no later than the current clock cycle (i.e., deadline has expired at or before current time t) is defined as the "workload-performance error" for the current cycle. If all instructions with deadlines no later than the current cycle have retired and processor 104 is starved of new instructions, the idle processor time is tracked by tracker module 110 by converting it to an equivalent number of executed instructions. In the case of idle processor time, according to an embodiment, the workload-performance error is considered a negative error and the magnitude of the error equals the converted equivalent number of instructions.

Figure 2:
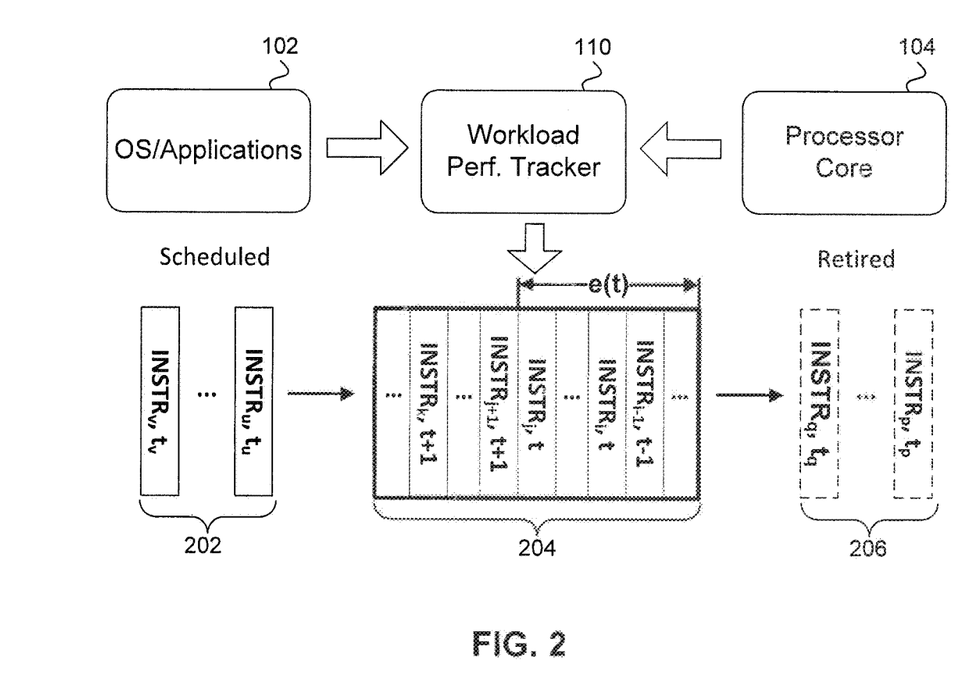
FIG. 2 is a block diagram illustrating workload performance tracking, in accordance with an embodiment.

The workload-performance error (i.e., e(t) in FIG. 2 and elsewhere in this disclosure) is calculated and input to a DVFS controller 108 by tracker 110. The workload-performance error value may be input to DVFS controller on every control cycle (i.e. cycle of the control loop). DVFS controller 108, in turn, determines a speed-setting command that is then input to a DVFS hardware/software block (DVFS HW/SW block) 106 which determines a supply voltage and a clock rate (e.g. frequency) of the processor being controlled (according to lookup table 116, in an embodiment). DVFS hardware/software (HW/SW) block 106 is the apparatus to actually configure the processor to run at the desired effective speed and/or voltage. DVFS HW/SW module 106 monitors the instruction pointer register and other status registers (not shown) associated with processor 104 to determine the operating conditions of the processor such as stall ratio, temperature, etc., and then set the processor voltage and/or frequency based on these operating conditions and the speed-setting command C(t) from controller 108. The stall ratio measures the processor idle time caused by events such as, memory access delay, resource waiting, interrupts, etc. During runtime, an adaptive adjustment module 120 adaptively adjusts a sampling frequency and gain of the control loop (e.g., controller 108, DVFS HW/SW 106, and tracker 110) coupled to processor 104 in response to characteristics of the input workload.

DVFS HW/SW 106 module can use a lookup table 116 and, in some embodiments, interpolation methods to find voltage and frequency setting under the specific speed-setting command and other conditions, such as, but not limited to, a stall ratio or temperature of the processor. According to an embodiment, lookup table 116 may include a plurality of entries of the form <C, S, f, V>, where f and V are desired frequency and supply voltage values, respectively, that correspond to a particular speed-setting command (C) and stall ratio (S). This can also be achieved using a formula, such as for stall compensation, the configured processor frequency can be calculated as $f=C/(1-S)$, where C is the speed-setting command received from DVFS controller 108. DVFS HW/SW 106 is used to directly configure the processor and hide nonlinearity and non-ideality from DVFS controller 108. By real-time status monitoring and compensation, the combined behavior of DVFS HW/SW 106 and processor 104 may be linear or close to linear. Processor 104 may be any processor that is capable of being dynamically (e.g. at runtime) configured with changes to the voltage or operating frequency.

FIG. 2 is a block diagram illustrating the determining of the error in workload performance tracking, in accordance with an embodiment. Tracker 110 receives input regarding scheduled instructions 202 from OS or Applications 102 and input regarding retired instructions 206 from processor 104. Retired instructions are instructions that have already been executed by the processor. The workload-performance error, e(t), is based upon the instructions in queue 204 that have a deadline timestamp that has already expired but have not been executed. According to an embodiment, e(t) is determined as the number of expired instructions that have not been retired. Other characterizations of e(t), such as, for example, considering e(t) as a proportion of expired instructions still in the queue to the total of currently pending instructions, are possible and are encompassed within embodiments. The workload-performance error for the current control cycle can be determined, for example, by monitoring an instruction queue 204.

Figure 3:
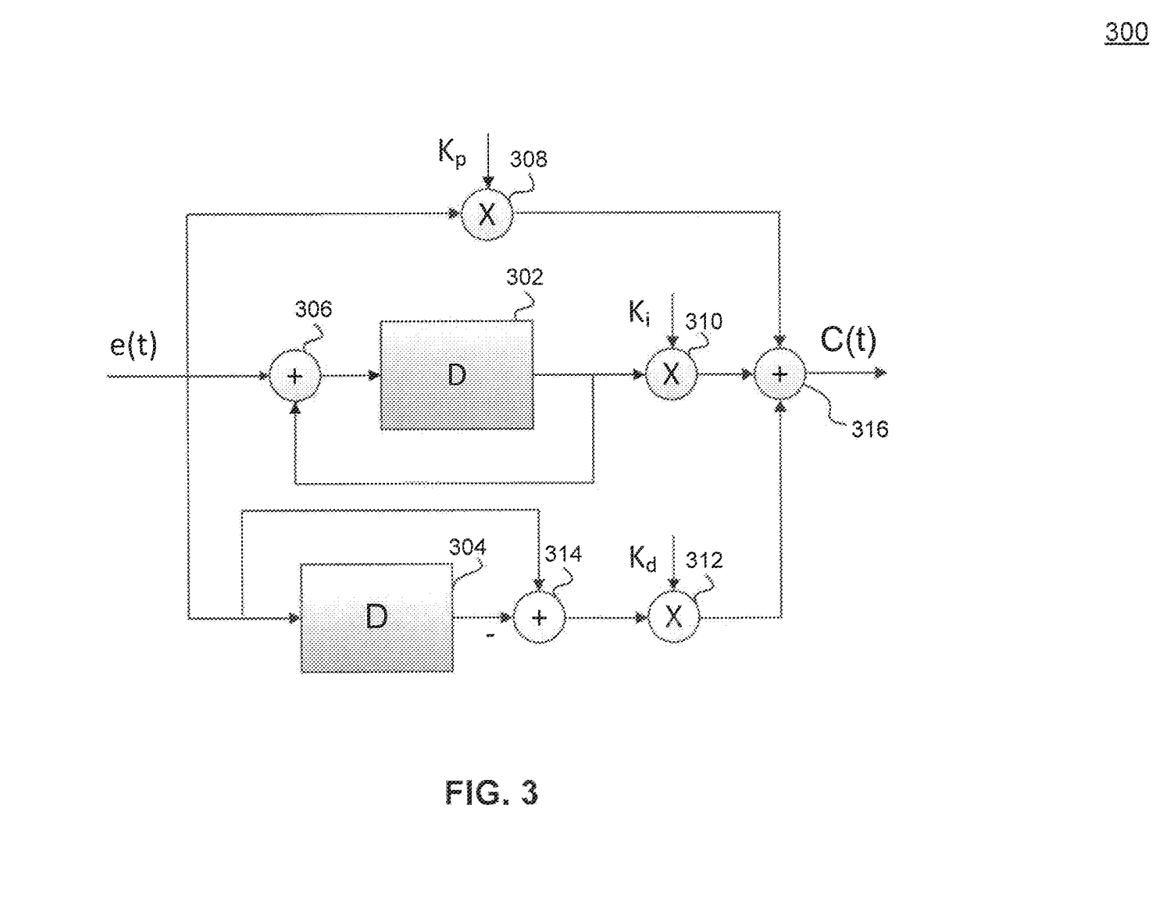
FIG. 3 is a block diagram of a DVFS controller, according to an embodiment of the present invention.

FIG. 3 is a block diagram of a DVFS controller 300, according to an embodiment of the present invention. FIG. 3 shows an example DVFS PID controller where D blocks 302 and 304 denote one cycle delays and $K_p$ (proportional gain), $K_i$ (integral gain), and $K_d$ (derivative gain) are the controller parameters. Besides PID, DVFS controller 300 can take many general formats of linear controllers (e.g., corresponding to one or more of $K_p$, $K_i$, $K_d$, and/or more D blocks and gains than shown in 300) according to the specific requirements. DVFS controller 300 takes as input a time sequence of work-performance errors e(t). It generates an effective speed-setting command C(t) for the processor by conducting linear scaling, (first-order or high-order) integration, and differentiation operations on this time sequence of errors. The goal of the controller is to keep the error e(t) at or close to zero (e.g., the perfect match of incoming workload and actual execution progress of the processor). The duration of the delays, imposed by D 302 and 304, may be changed based upon sampling frequency (which, as described below, may be adaptively adjusted in embodiments). In an embodiment, values for $K_p$, $K_i$, and $K_d$ are determined at the time the controller is designed, and remain constant (if the adaptive gain is considered separately as described in the following). The operating frequency for multipliers 308, 310, and 312, as well as adders 306, 314 and 316, however, change based upon the adaptive sampling frequency.

Figure 4:
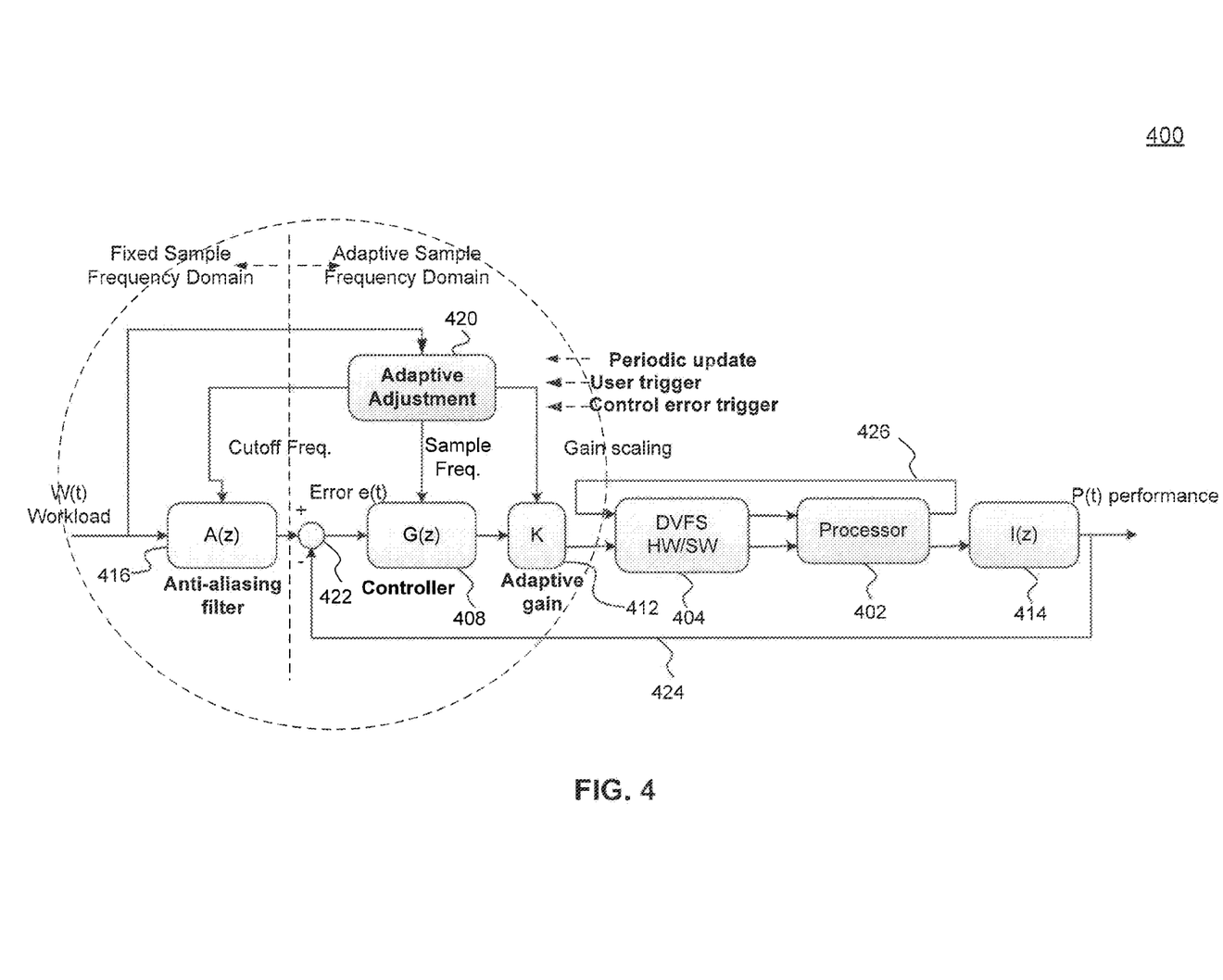
FIG. 4 is a block diagram of a system including a DVFS controller, according to an embodiment of the present invention.

FIG. 4 is a block diagram of a system 400 including an adaptively adjusted DVFS controller 408, according to an embodiment of the present invention. An adaptive adjustment block 420 monitors signals including, but not limited to, one or more of the incoming workload, trigger signals, and workload-performance error. Based upon one or more of the monitored signals, adaptive adjustment block 420 adjusts one or more of a sampling frequency, an adaptive control gain 412, or a cutoff frequency of anti-aliasing filter 416. An adder 422 takes the workload W(t) (or output of anti-aliasing filter if it exists in the system and processor performance P(t) as inputs, and determines the workload-performance error e(t). Controller (sometimes also referred to by its transfer function G(z)) 408 takes the workload-performance error e(t) from the adder 422, and determined a speed-setting command. The speed-setting command may indicate an increase or decrease of the speed of the processor. An adaptive gain block 412 multiplies the speed-setting command from controller 408 by an adaptive gain K that can be configured by adaptive adjustment block 420. Although shown separately in FIG. 4, adaptive gain block 412 may be included in the controller block (e.g., as in FIGS. 5 and 6). To emphasize the adaptive gain, in FIG. 4, 412 is shown separately from DVFS controller G(z) 408. However, in many embodiments, adaptive gain block 412 can be considered as a part of the DVFS controller G(z) and may not be separately illustrated (e.g., FIGS. 5 and 6).

The output of adaptive gain block 412 is input to DVFS HW/SW block 404. DVFS HW/SW block 404 determines a supply voltage and/or clock rate (frequency) and then provides the determined supply voltage and clock rate to processor 402. Processor 402 is then reconfigured in accordance with the supply voltage and/or clock rate (frequency) determined by DVFS HW/SW block 404. Feedback from processor 402, such as, but not limited to, stall ratio, is provided to DVFS HW/SW block 404 via feedback path 426 to be used in determining the supply voltages and clock rates. Processor 402 performance P(t) is determined through integrator I(z) 414. I(z) may translate the effective speed of processor 402 to the performance of processor (i.e., the number of executed instructions). The performance information, or information derived based on the performance, is provided as feedback to controller 408 through adder 422 in the form of workload-performance error e(t). The feedback from I(z) to controller 408, according to an embodiment, may include information regarding the instructions that were retired in the immediately preceding clock cycle. The feedback may be provided to controller 408 via feedback path 424. Based upon the input workload stream, received either through anti-aliasing filter or directly, and the feedback received from I(z) 414, the workload-performance error e(t) is determined, and the newly determined e(t) is input to controller 408.

An anti-aliasing filter A(z) 416 may be placed prior to the input to controller 408, in order to filter noise and/or the higher frequency components (e.g., frequency components that are higher than half of sampling frequency of the DVFS control loop) from the input workload, Adaptive adjustment block 420 may provide a dynamically determined cutoff frequency to anti-aliasing filter 416 in order to adaptively control the range of input workload bandwidth that is visible at the controller.

As shown in FIG. 4, system 400 has a portion that operates in a fixed sampling frequency domain, and a portion that operates in the adaptive frequency domain. The fixed frequency domain includes the anti-aliasing filter 418, and the adaptive frequency domain includes the adaptive adjustment module 420, controller 408 and adaptive gain module 412. According to an embodiment, the fixed frequency domain is configured to operate at a frequency value that is at least two times of the highest frequency components in the input workload.

Figure 5:
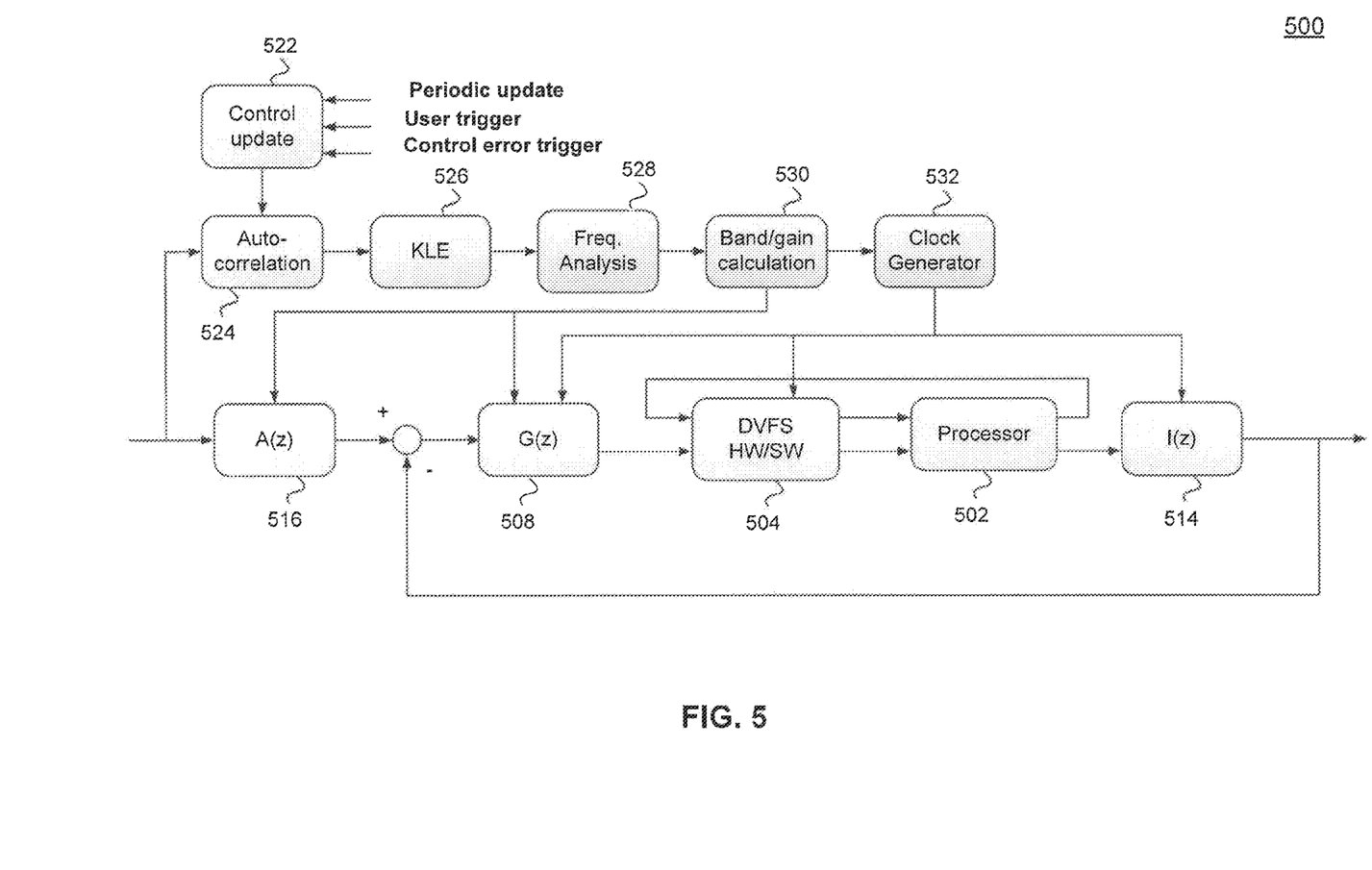
FIG. 5 is a more detailed block diagram of a system including a DVFS controller, according to an embodiment of the present invention.

FIG. 5 is a block diagram including more details of an adaptive adjustment block (such as block 420 in FIG. 4), according to an embodiment of the present invention. A control update block 522 is configured to determine when to trigger an adaptive adjustment. The determination of the adaptive adjustment can be based upon one or more of a duration-based (e.g. periodic update), a user-provided trigger, or a control error trigger. A control error trigger may be based, for example, on the workload-performance error e(t) exceeding a threshold or lower than a threshold.

An auto-correlation block 524 is configured to calculate the auto-correlation matrix of the input workload. The auto-correlation matrix can be calculated according to Equation (4). According to an embodiment, the calculation of auto-correlation involves multiplication of the input workload stream and its time-shifted version, and averageover-time operations. The correlated input workload is provided to a KLE block 526.

KLE block 526 is configured to perform Karhunen Loeve Expansion upon the input workload (by utilizing the auto-correlation matrix generated by 524) to determine a set of KLE coefficients (sometimes also referred to as "coefficient functions"). The KLE approach models a class of workloads as a random process and decomposes it into a sum of statistically weighted deterministic orthogonal basis functions. A powerful feature of KLE is that it extracts the stochastic structure of workloads by revealing the temporal frequency contents of various components (basis fictions) and their stochastic significances (weights). In time domain, every workload trace seems very different from each other. But from a statistical perspective, they share certain common signatures. KLE is a powerful tool to identify these signatures behind the apparent time-domain randomness. The KLE analysis takes the stochastic nature of workloads into consideration and effectively transforms the stochastic controller design problem into a controller optimization problem under a set of deterministic KLE coefficient function inputs (obtained from characterization of the workloads).

Subsequent to the KLE block 526, the KLE coefficient functions ($w_i(t)$ in Equation (7)) of the input workload is analyzed by a frequency analysis block 528. Frequency analysis block 528 may use Fast Fourier Transform (FFT) Analysis or other variants of Fourier Transform to determine the frequency components included in the input workload. The results of frequency analysis (i.e., the lowest, highest, and major frequency components contained in the input workload and the weights of all major frequency components) are provided to a band/gain calculation block 530.

Band/gain calculation block 530 is configured to determine the adaptive sampling frequency of the DVFS control loop, an adaptive gain, and/or the cutoff frequency of anti-aliasing filter 516. According to an embodiment, the sampling frequency of the DVFS control loop is set at least two times of the highest frequency of major components in the input workload according to Shannon's Theorem. It can also be determined by scaling the sampling frequency of the baseline control loop proportionally to the bandwidth ratio of the new workload to the baseline workload. For example, assume the sampling frequency of the baseline control loop is the 100 Hz and the bandwidth of baseline workload is 0-10 Hz. If the bandwidth of the current workload is 0-20 Hz, then the new adaptive sampling frequency should be 100 Hz*(20 Hz/10 Hz)=200 Hz. The cutoff frequency of anti-aliasing filter 516 may be set lower than half of the sampling frequency of DVFS control loop but higher than the highest major (desirable to keep) frequency component in the input workload to eliminate the potential frequency alias and keep the desirable frequency content. In the above example, the cutoff frequency can be between 20 Hz and 100 Hz. The adaptive gain can be set to adjust the average workload-performance error e(t) to the required level. For example after a new adaptive sampling frequency is set, the average of control error e(t) is r1 and old adaptive (closed-loop) gain is k1, but the required average error is r2, then the new adaptive (closed-loop) gain should be k2=(1+k1)*(r1/r2)−1 (when k1 and k2 are much larger than 1, approximately k2=k1*r1/r2). The newly determined sampling frequency is provided to a clock generator 532 to generate the sampling clock signal. The newly determined adaptive gain is provided to controller G(z) 508 to adjust the closed-loop gain. The newly determined cutoff frequency is provided to A(z) 516 to adjust its passband.

Clock generator 532 generates the sampling clock signal for the DVFS control loop. The clock signal from clock generator 532 is provided to controller 508, DVFS HW/SW block 504 and integrator I(z) 514. According to an embodiment, control update module 522, auto-correlation module 524, KLE module 526, frequency analysis module 528, band/gain calculation module 530, clock generator 532, are components included in adaptive adjustment module 420. In some implementations, auto-correlation block 524, and KLE block 526 are skipped and frequency analysis is directly applied to the input workload by 528 and this frequency analysis result or its averaged version is used to determine the adaptive sampling frequency, the adaptive gain, and cutoff frequency.

Figure 6:
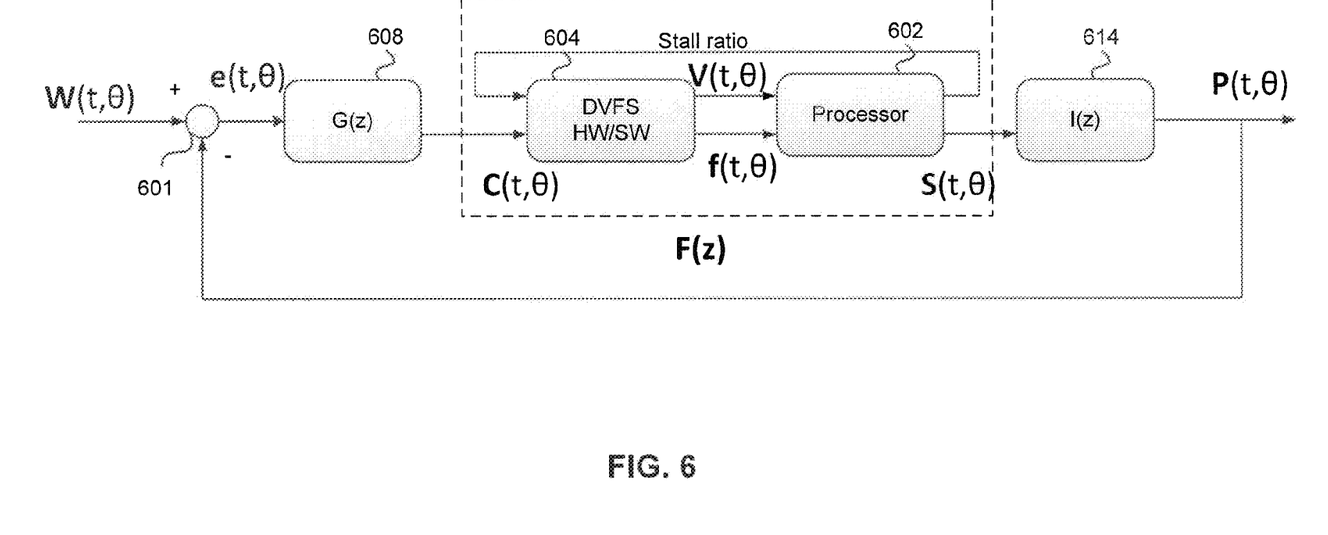
FIG. 6 is block diagram illustrating the DVFS control process, according to an embodiment of the present invention.

FIG. 6 is a block diagram illustrating a portion of the DVFS control process, according to an embodiment of the present invention. FIG. 6 illustrates a portion of the DVFS system in a control-theoretical format. The integrator I(z) 614 and the adder 601 in FIG. 6 model the operations of tracker 110 illustrated in FIG. 1. Other blocks (e.g. controller 608, DVFS HW/SW 604, and processor 602) are one-to-one mapped between FIGS. 6 and 1. The uncertainty of workloads from applications/OS is modeled by a random process $W(t,\theta)$ (referred to as the workload of the processor in this disclosure), where t is the discrete time index and $\theta$ denotes a point in the random space. Workload is defined as the number of instructions that need to be executed (by time t) by processor 602 to meet the real-time or QoS requirements. The number of instructions is counted from a starting time $t_0$, e.g. $t_0$=0. Due to this random workload input, other state variables in the system are all random processes. The system output $P(t,\theta)$ is referred to as the performance of the processor. To make the notations concise in other parts of this document, $\theta$ may be omitted, for example $P(t,\theta)$, $f(t,\theta)$, $S(t,\theta)$, $V(t,\theta)$, $C(t,\theta)$, $e(t,\theta)$, and $W(t,\theta)$ are equivalent to as $P(t)$, $f(t)$, $S(t)$, $V(t)$, $C(t)$, $e(t)$, and $W(t)$.

Performance may be defined as the number of instructions that are actually executed by the processor since the starting time $t_0$. Embodiments control the performance of the processor $P(t,\theta)$ to match its workload $W(t,\theta)$. System error $e(t,\theta)$ is the difference between $W(t,\theta)$ and $P(t,\theta)$. The optimal control loop should minimize the system error $e(t,\theta)$. In FIG. 4, controller G(z) takes the error $e(t,\theta)$ as input and generates a processor speed-setting command $C(t,\theta)$. Transfer function F(z) represents the behavior of DVFS HW/SW module and the processor. For simplicity, F(z) may be referred to as the transfer function of the processor. F(z) takes the speed-setting command as input, adjusts the processor voltage and clock frequency accordingly, and generates the effective speed of the processor that is measured by the number of instructions actually executed per unit time by the processor. This metric is commonly defined as instructions per second (IPS), and it accounts for processor stalls caused by real-world non-idealities. The DVFS HW/SW module monitors and accounts for the stall ratio in real time, and adjusts the effective processor speed according to the setting speed $C(t,\theta)$.

The DVFS HW/SW may be considered to achieve good compensation in real time. Therefore, F(z) may be approximated by a linear block (such as F(z)=CONST, and CONST is a constant). The integrator block I(z) translates the effective speed of the processor to the performance of processor (i.e., the number of executed instructions).

Figure 7:
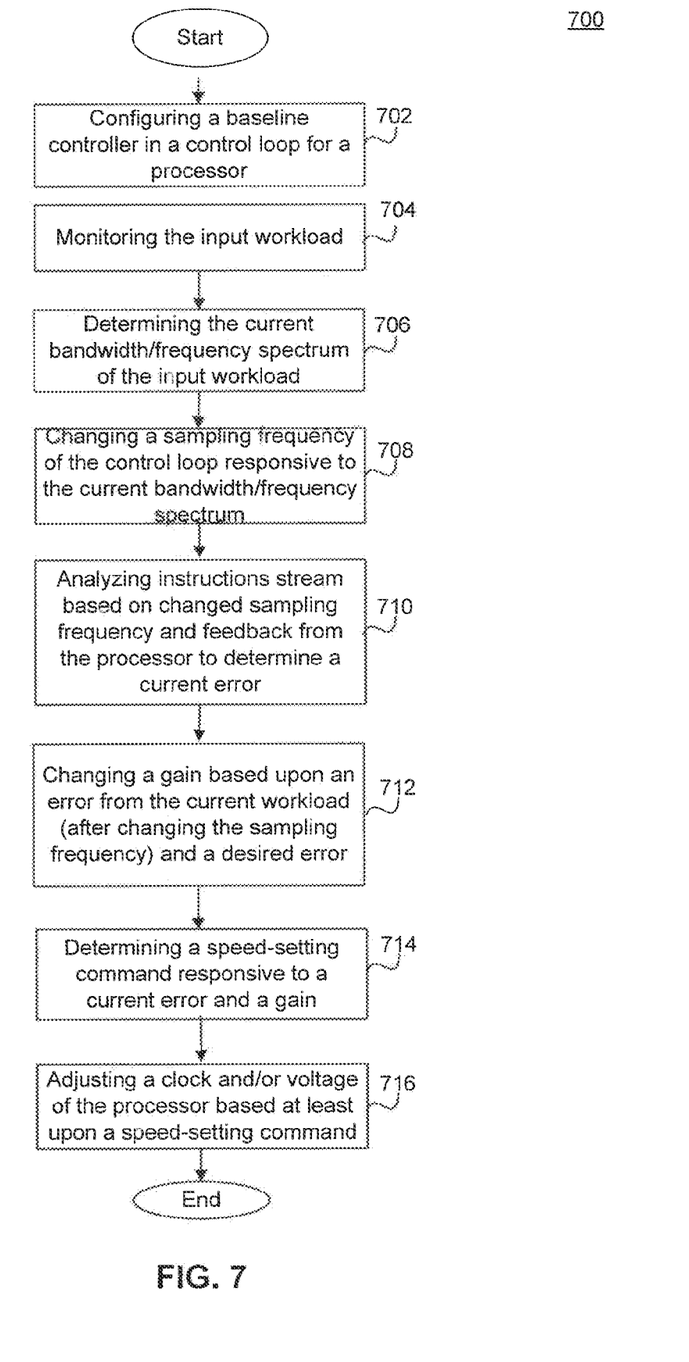
FIG. 7 is a flowchart of a method for DVFS control of a processor, according to an embodiment of the present invention.

FIG. 7 is a flowchart 700 of a method for DVFS control of a processor, according to an embodiment of the present invention. Embodiments may include some or all of the stages 702-716, and may perform the stages in orders other than that shown in flowchart 700. Method 700 may be performed to adaptively adjust a sampling frequency and gain provided to a DVFS controller, and/or cutoff frequency provided to an anti-aliasing filter. Method 700 can be implemented by the hardware and/or software modules such as that described in relation to FIGS. 3-6.

At stage 702, a control loop, as shown in FIG. 4, is configured using a controller configured according to a determined baseline. According to an embodiment, the baseline controller is configured in accordance with a transfer function of the system illustrated in FIG. 4. The controller configured may be controller 408 shown in FIG. 4. The control error transfer function (from output of A(z) 416 to workload-performance error e(t)) of system 400 can be represented as:

$$H_e(z) = \frac{1}{1 + G(z)F(z)I(z)} \quad (1)$$

Where G(z) and F(z) are the transfer functions of the controller 408 (including adaptive gain block 412) and processor 402 (including DVFS HW/SW 404), respectively, and $I(z)=1/(1-z^{-1})$ represents integrator block 414. I(z) and F(z) may not be changed. G(z) may be changed to effect the desired change in $H_e(z)$.

According to an embodiment, for a PID controller such as that shown in FIG. 3, G(z) may be represented as:

$$G(z) = K_p + K_i \frac{1}{z-1} + K_d(z-1) \quad (2)$$

$K_p$, $K_i$ and $K_d$ are the configurable values that can be tuned to minimize an objective function using one or more optimization techniques. The selected optimization objective may be the reduction of the mean squared control error. The stability condition of $H_e(z)$, such as requiring that all poles are inside the unity circle, can be set as an optimization constraint. Various optimization techniques and tools may be used to design the controller as described above. Example optimization techniques include, but are not limited to, standard algorithms implemented in Matlab™ Optimization Toolbox, and more advanced algorithms used in control theory area.

The parameters $K_p$, $K_i$, and $K_d$ in controller G(z) are tuned to minimize the selected optimization objective (i.e., the mean squared control error), represented as:

$$\text{Opt\_objective} = \sum_{i=1}^{N} |H_e(e^{j\omega_i})|^2 \lambda_i - \varepsilon \quad (3)$$

$\varepsilon$ is a small positive number that can be set according to the control precision requirement (e.g., $\varepsilon$ is set to the desired average squared relative error). $\varepsilon$ may account for the limited dynamic range/bandwidth of data paths associated with implementing the controller using fixed-point digital circuits or processors.

$H_e(z)$ is obtained from (1), and $\lambda_i$ and $\omega_i$ are obtained by characterizing workloads, and $\varepsilon$ is set to the desired squared relative control error.

$\lambda_i$ and $\omega_i$ may be determined by characterizing a set of sample workloads. Based on sample traces collected, a workload autocorrelation matrix can be determined as below.

$$R = \begin{bmatrix} R(1,1) & R(1,2) & \cdots & R(1,n) \\ R(2,1) & R(2,2) & \cdots & R(2,n) \\ \vdots & \vdots & \ddots & \vdots \\ R(n,1) & R(n,2) & \cdots & R(n,n) \end{bmatrix} \quad (4)$$

where $R(i,j)=E[W(i,\theta)-\overline{W}(i,\theta))(W(j,\theta)-\overline{W}(j,\theta))]$ i, j=1, 2, ..., N. $\overline{W}(t,\theta)$ is the mean function of $W(t,\theta)$, and is a deterministic function.

The eigenvalue equation of R can be obtained according to (5) below.

$$Rv_i = \lambda_i v_i \quad (5)$$

Because autocorrelation matrix R is positive semi-definite, its eigenvalues $\lambda_i$ are nonnegative. The eigenvalues can be ordered from the largest to the smallest, $\lambda_1 > \lambda_2 > \ldots > \lambda_N$. $v_i$ are all orthonormal vectors.

$$W(t,\theta) = \overline{W}(t,\theta) + \sum_{i=1}^{N} w_i(t)\mu_i(\theta) \quad (6)$$

$$t = 1, 2, \ldots, N$$

$\omega_i(t)$ can be constructed (as shown in Equation (10)) by solving the eigenvalue equation of autocorrelation matrix (i.e., R) of $W(t,\theta)$.

By defining $\overline{W}(t,\theta)=w_0(t)$ Equation (6) becomes $$W(t,\theta) = \sum_{i=0}^{\infty} w_i(t)\mu_i(\theta) \quad (7)$$

$$t = 1, 2, 3, \ldots$$

where t is the discrete time index and $\theta$ denotes a point in the random space. The workload defined over discrete time means the desired total number of executed instructions or total throughput (or the normalized instruction or throughput number) over the period from the reference time $t_0$ to time t. Its mean is usually non-zero and increases with time. It is assumed zero-mean here, but this treatment can be extended to a non-zero mean case by adding a mean function in KLE. $\mu_i$ are a set of orthogonal random variables (RVs) with zero mean and unity variance. $w_i(t)$ are a set of orthogonal deterministic functions defined over the discrete time. Orthogonality of $\mu_i$ set and $w_i(t)$ yields $$E[\mu_i \mu_j] = \begin{cases} 1 & \text{if } i = j \\ 0 & \text{otherwise} \end{cases} \quad (8)$$

and $$\sum_{t=1}^{\infty} w_i(t)w_j(t) = \begin{cases} \lambda_i & \text{if } i = j \\ 0 & \text{otherwise} \end{cases} \quad (9)$$

Then, KLE coefficient functions $w_i(t)$ can be obtained as $$[w_i(1) w_i(2) \ldots w_i(N)]^T = \sqrt{\lambda_i} v_i \quad (10)$$

$\omega_i$ in Equation (3) denotes the peak frequency in the frequency spectrum of every KLE coefficient function $w_i(t)$. It can be obtained by performing frequency analysis (such as Fourier transform) on every $w_i(t)$ and identifying the peak frequency in its spectrum.

KLE is optimal in the sense that it minimizes the total mean squared errors caused by the truncation of the expansion. KLE adapts to the process to produce the best basis for its expansion. The mean squared contribution of every $w_i(t)$ to $W(t,\theta)$ is proportional to the value of its corresponding $\lambda_i$. Usually most of the contribution to $W(t,\theta)$ is concentrated only on few $w_i(t)$ corresponding to the largest eigenvalues $\lambda_i$.

Due to this feature, KLE can be effectively truncated to reduce computation and minimize the error. The relative mean squared error caused by removing $w_m(t)$ to $w_N(t)$ terms is represented below.

$$r_e = \frac{\sum_{i=m}^{N} \lambda_i}{\sum_{i=1}^{N} \lambda_i} \quad (11)$$

Having formed the control loop, as shown, for example, in FIG. 4, with a baseline controller as described above, the adaptive control of the processor may proceed from stage 704. In some embodiments, adaptive gain 412 is set to K=1 for the baseline controller.

At stage 704, the input workload is monitored. Monitoring of the input workload may be performed, according to an embodiment, by adaptive adjustment module 420. The monitoring may be performed on a continuous basis or on a triggered basis. The monitoring and/or adaptive adjustment may be initiated by a trigger based upon, for example, a configured duration (e.g., periodically triggered by a timer), a user provided trigger (e.g., user manually initiates the monitoring, change of application workload notice from the user or application software), or a control error. The trigger due to control error may be initiated when the workload-performance error crosses a threshold. When the error exceeds an upper threshold or is smaller than a lower threshold, or forced by the user, application software or a periodic timer signal, adaptive adjustment may be initiated so that the DVFS control loop may be reconfigured to better address the changing workload which may have caused the increased control error or excessive power state switch of the processor. At stage 706, the bandwidth of the current input workload is determined based upon the monitoring. The bandwidth of the current input workload may be determined in the same or similar manner to that used to determine the bandwidth of sample workloads as described above in relation to stage 702. As described above (in relation to characterizing the workloads in determining the baseline controller), the use of ISLE and Fourier transform (such as FFT) to determining the bandwidth of the current input workload effectively accounts for the stochastic nature of the workload. The determination of the bandwidth may be performed by adaptive adjustment block 420 and/or its components 524, 526, 528 and/or 530 shown in FIG. 5. In some implementations, blocks 524 and 526 in FIG. 5 may not be used and frequency analysis operation 528 is directly performed on the input workload. In some embodiments, determining the bandwidth may include determining the detailed frequency spectrum of the current input workload including the major frequency components.

In some embodiments, an anti-aliasing of the input workload signal is performed before the processing at the controller. Anti-aliasing may be performed, for example, by an anti-aliasing filter such as filter 416 illustrated in FIG. 4. The anti-aliasing removes the noise or minor signal component above the major component band. The cutoff frequency may be preconfigured or may be adaptively adjusted. Adaptive adjustment of the cutoff frequency may be based upon the input workload and/or the sampling frequency.

According to an embodiment, the cutoff frequency for the anti-aliasing filter to be configured with is adapted so that it is at least two times smaller than the adaptive sampling frequency (determined as described below with respect to stage 710) and higher than the major frequency components in the input workload and/or the controller upper passband frequency. For example, if the adaptive sample frequency is 700 Hz, then the cutoff frequency may not be higher than 350 Hz. The cutoff frequency may be also proportionally adjusted with the sample frequency by adjusting the filter parameters.

At stage 708, a new sampling frequency is determined based upon the detected bandwidth of the current input workload. The new adaptive sampling frequency should be at least higher than two times of the highest frequency in major components of the input workload. Further details can be found in the description of the adaptive adjustment blocks 420 and 530. If the application specifies a measurement time window for the required real-time performance metric (such as the miss rate), the period of the sampling frequency must be shorter than the time window.

The bandwidth of the input workload determines the bandwidth of the controller, such as, controller G(z) of FIG. 4. The controller bandwidth must cover the workload bandwidth and also have a high gain over the bandwidth to achieve small workload-performance errors. According to an embodiment, the sampling frequency is determined to be two times larger than the controller bandwidth. In various embodiments, the ratio of the sampling frequency to the controller bandwidth may be between 2 to 10.

In order to adaptively adjust the sampling frequency, the ratio of the current input workload bandwidth and the workload bandwidth for the previous sampling frequency is determined. The sampling frequency is then scaled by this ratio. The determination of the new sampling frequency may be performed, for example, by adaptive adjustment module 420 or its component band/gain calculation block 530.

The changed sampling frequency is used to configure a clock rate for the control loop, including for controller 408, I(z) 414, and DVFS HW/SW 404. Thus, after the configuration, portions of the control loop, including one or more of controller 408, I(z) 414, and DVFS HW/SW 404, operates at rate corresponding to the changed sampling frequency. According to an embodiment, the clock rate for the control loop or components of the control loop are set to the changed sampling frequency.

At stage 710, analyzing of the instructions stream is performed based on feedback from the processor and/or changed sampling frequency and to determine a current error. According to an embodiment, the incoming instructions are compared, based on their execution deadlines, with feedback from the processor regarding retired instructions. As described above, the number of instructions with execution deadlines expired but that have not been retired are counted as errors. The determination of the error can be performed, for example, in adder 422. The determined error, e(t), is seen at the input to the controller as a time sequence of errors.

At stage 712, a new gain is determined based upon the input workload bandwidth and the determined sampling frequency.

According to an embodiment, the gain over the passband of G(z) is determined based upon the error requirements. The relationship between the gain and the error may be in accordance with r=1/(1+k), where r is the relative error and k is the closed-loop gain over the passband. For example, if the bandwidth of the input workload is 0-50 Hz, then the bandwidth of the controller G(z) which should be wider than the bandwidth of the input workload may be set to 0-70 Hz and the sampling frequency may be set to 5 times of G(z) bandwidth, i.e. 350 Hz. To achieve a 1% relative error, the gain would be set to k=1/r−1=99 or an even larger number. In this example, it is assumed that the passband of G(z) is flat.

When the sampling frequency is changed due to adaptive adjustment, the current gain also changes. In order to adaptively adjust the gain, the gain may also be scaled. According to an embodiment, the new gain s may be scaled from the previously set gain $k_0$ in accordance with $s=(r_0+k_0*r_0-r)/r*k_0$, where $r_0$ is the current relative error prior to gain adjustment and r is the desired relative error.

According to another embodiment, the gain scaling factor can also be calculated from the errors generated by applying the KLE coefficient functions to the control loop. The ratio between the sum of squared errors generated by the KLE coefficient functions of current workload and that of baseline workload can be used for the gain adjustment.

The gain adjustments may be limited by a predetermined maximum. According to an embodiment, a gain range that maintains a stable control loop can be determined when the baseline controller G(z) is designed (e.g., before the adaptive adjusting process is initiated), and this gain range may be used as a limit to any gain adjustments.

At stage 714, a speed-setting command is determined based upon the error, e(t), input to the controller and the determined gain. The controller may generate a initial speed-setting command C(t) as described above in relation to FIGS. 3 and 6. The initial speed-setting command is then adjusted in accordance with the determined gain. The gain-adjusted speed-setting command is provided as input to a DVFS HW/SW block. The adaptive sampling frequency may change the generation frequency of the speed-setting command.

At stage 716, one or more of the supply voltage or the clock rate of the processor is adjusted based upon the speed-setting command from the controller and, according to some embodiments, other considerations such as a stall ratio and temperature of the processor. According to an embodiment, DVFS HW/SW determines the supply voltage and/or the clock rate for the processor using a lookup table and interpolation methods.

Processing logic described with respect to FIGS. 1-7 can include commands and/or other instructions specified in a programming language such as C and/or in a hardware description language such as Verilog, RTL, or netlists, to enable ultimately configuring a manufacturing process through the generation of maskworks/photomasks to generate a hardware device embodying aspects of the invention described herein. According to an embodiment, the processing logic may be stored in a computer readable storage medium such as, but not limited to, a memory, hard disk, or flash disk.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method for configuring a logic block, comprising:
changing a sampling frequency of at least a portion of a control loop coupled to the logic block in response to a change in a current input workload; and
adjusting one or more of a clock rate and a voltage of the logic block to reduce a difference between a current workload-performance error after the changing and a desired workload-performance error;
wherein the workload-performance error is based on an execution deadline for at least one instruction queued for execution by the logic block.

2. The method of claim 1, wherein the adjusting comprises:
scaling a gain of a controller in the control loop based upon the current workload-performance error and the desired workload-performance error; and
determining a desired speed based upon an output of the controller, wherein the output includes the scaled gain, wherein the adjusting is based at least upon the desired speed.

3. The method of claim 2, wherein the adjusting further comprises:
determining a stall ratio of the logic block; and
wherein the adjusting is further based upon at least the determined stall ratio.

4. The method of claim 1, wherein the changing a sampling frequency comprises:
determining a bandwidth of the current input workload; and
determining the sampling frequency based upon a bandwidth of the current input workload.

5. The method of claim 4, wherein the changing a sampling frequency further comprises:
configuring a clock signal based upon the determined sampling frequency to at least the controller.

6. The method of claim 1, wherein the changing a sampling frequency comprises:
performing a Karhunen Loeve Expansion (KLE) of the current input workload to determine KLE coefficients; and
performing frequency analysis upon the KLE coefficients to determine the bandwidth.

7. The method of claim 6, wherein the changing a sampling frequency further comprises:
auto-correlating the current input workload before performing the KLE, and wherein the KLE is performed upon the auto-correlated current input workload.

8. The method of claim 1, further comprising:
determining a current workload-performance error of the logic block after the changing.

9. The method of claim 1, wherein the determining a current workload-performance error comprises:
analyzing an instruction stream from the current input workload and a feedback from the logic block to determine the current workload-performance error.

10. The method of claim 9, wherein the analyzing the instruction stream comprises:
determining instructions having expired execution deadlines.

11. The method of claim 1, further comprising:
filtering at least one of noise or high frequency components in the current input workload prior to said determining the current workload-performance error.

12. A system, comprising:
at least one processor configured to operate under one or more of multiple clock rates or multiple voltages in response to at least a reconfiguration command; and
a control loop coupled to the at least one processor, configured to:
 change a sampling frequency of at least a portion of the control loop in response to a change in a current input workload; and
 adjust one or more of a clock rate and a voltage of the processor to reduce a difference between a current workload-performance error after the change and a desired workload-performance error;
wherein the workload-performance error is based on an execution deadline for at least one instruction queued for execution by the processor.

13. The system of claim 12, wherein the control loop is further configured to:
scale a gain of a controller in the control loop based upon the current workload-performance error and the desired workload-performance error; and
determine a desired speed based upon an output of the controller, wherein the output includes the scaled gain,
wherein the adjusting is based at least upon the desired speed.

14. The system of claim 12, wherein the control loop is further configured to:
determine a bandwidth of the current input workload; and
determine the sampling frequency based upon the bandwidth of the current input workload.

15. The system of claim 14, wherein the control loop is further configured to:
configure a clock signal based upon the determined sampling frequency to at least the controller.

16. The system of claim 12, wherein the control loop is further configured to:
performing a Karhunen Loeve Expansion (KLE) of the current input workload to determine KLE coefficients; and
performing a frequency analysis upon the KLE coefficients to determine the bandwidth.

17. The system of claim 12, wherein the control loop includes a controller configured responsive to at least one of a proportional gain, an integral gain, and a derivative gain.

18. The system of claim 12, further comprising an anti-aliasing filter coupled to the control loop and configured to filter at least one of noise or high frequency components in the current input workload using a cutoff frequency prior to said determining the current workload-performance error, wherein the cutoff frequency is responsive to the changed sampling frequency.

19. An article of manufacture comprising a non-transitory computer readable storage medium having hardware description language instructions encoded thereon to describe a device comprising circuitry configured to perform operations comprising:
changing a sampling frequency of at least a portion of a control loop coupled to the processor in response to a change in a current input workload; and
adjusting one or more of a clock rate and a voltage of the processor to reduce a difference between a current workload-performance error after the changing and a desired workload-performance error;
wherein the workload-performance error is based on an execution deadline for at least one instruction queued for execution by the logic block.

20. The article of manufacture of claim 19, wherein the adjusting comprises:
scaling a gain of a controller in the control loop based upon the current workload-performance error and the desired workload-performance error; and
determining a desired speed based upon an output of the controller, wherein the output includes the scaled gain,
wherein the adjusting is based at least upon the desired speed.

21. The article of manufacture of claim 19, wherein the changing a sampling frequency comprises:
performing a Karhunen Loeve Expansion (KLE) of the current input workload to determine KLE coefficients; and
performing a frequency analysis upon the KLE coefficients to determine the bandwidth.

* * * * *